United States Patent
Makarevich et al.

(10) Patent No.: US 11,442,710 B2
(45) Date of Patent: Sep. 13, 2022

(54) REPOSITORY DEPENDENCY MANAGEMENT

(71) Applicants: Atlassian Pty Ltd., Sydney (AU); Atlassian Inc., San Francisco, CA (US)

(72) Inventors: Nadezhda Makarevich, Sydney (AU); Marcin Szczepanski, Sydney (AU); Aliaksei Shpakau, Sydney (AU); Ian Michael Hill, Sydney (AU); Marco de Jongh, Sydney (AU); Luke James Batchelor, Sydney (AU); Hannes Obweger, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/039,180

(22) Filed: Sep. 30, 2020

(65) Prior Publication Data

US 2022/0100480 A1 Mar. 31, 2022

(51) Int. Cl.
*G06F 8/41* (2018.01)
*G06F 8/65* (2018.01)

(52) U.S. Cl.
CPC .............. *G06F 8/433* (2013.01); *G06F 8/427* (2013.01); *G06F 8/65* (2013.01)

(58) Field of Classification Search
CPC ............. G06F 8/433; G06F 8/427; G06F 8/65
See application file for complete search history.

(56) References Cited

U.S. PATENT DOCUMENTS

| | | | |
|---|---|---|---|
| 8,347,263 B1* | 1/2013 | Offer | G06F 8/71 717/104 |
| 2006/0288054 A1* | 12/2006 | Johnson | G06F 8/61 |
| 2008/0127088 A1* | 5/2008 | Harmsen | G06F 8/60 717/121 |
| 2012/0144378 A1* | 6/2012 | Shah | G06F 8/60 717/170 |
| 2016/0246583 A1* | 8/2016 | Kolesnik | G06F 8/63 |
| 2017/0161046 A1* | 6/2017 | Riewrangboonya | G06F 9/45558 |
| 2020/0285488 A1* | 9/2020 | Yao | G06F 9/45533 |

* cited by examiner

*Primary Examiner* — Daxin Wu
(74) *Attorney, Agent, or Firm* — Brownstein Hyatt Farber Schreck, LLP

(57) ABSTRACT

Described herein is a computer implemented method for managing a repository that includes one or more component packages and a repository configuration file listing repository dependencies. Each component package has a package configuration file listing package dependencies. The method including the steps of: parsing the repository configuration file; aliasing a package dependency listed in the repository configuration file with at least two repository dependency aliases; parsing a package configuration file; and linking each repository dependency alias to a package dependency listed in the package configuration file.

20 Claims, 5 Drawing Sheets

REPOSITORY DEPENDENCY MANAGEMENT

FIELD

The present disclosure is directed to software development tools. In particular, the present disclosure is directed to software development tools for managing software packages.

BACKGROUND

Projects developed in the JavaScript® language typically make use of libraries of prewritten code known as "packages". The developer's own JavaScript project may itself be a package. Generally speaking, a software package includes multiple components, each of which provides a function. For example, a package may provide components in the form of user interface elements that developers use to create client-side JavaScript applications. Other packages may provide components such as web servers or application servers that developers use to create server-side JavaScript applications.

In the open source community, developers make their packages available to other developers by uploading the package to an online repository. For example, the "npm Registry" is a repository of packages that developers can download and use (or "consume") in their own JavaScript projects.

Generally speaking, when developing a package, the developer creates a top-level directory for the project (known hereafter as the "project directory") and a directory hierarchy thereunder to store the files and metadata that comprise the project. For example, a developer may create a subdirectory named "/src" to store the project's source code files. This directory hierarchy is often preserved when the package is distributed to a repository.

Software tools known as "package managers" automate the process of downloading a package from a repository and installing it in the local directory hierarchy of the project. For JavaScript code that is to be executed in the "Node.js" runtime environment or "React" framework, external packages are typically installed under a directory known as "node_modules". Package managers are also used to update packages to newer versions and remove deprecated packages.

There are a variety of package managers that can interface with the npm Registry, including npm (or "node package manager"), yarn, ied, pnpm, and npmd. Package managers typically provide a client-side common line interface (CLI) and in-built commands that the developer uses to perform package-related operations.

For JavaScript projects, metadata relevant to the project is stored in JavaScript Object Notation (JSON) format in a file located in the project directory. Typically, the file is named "package.json" or similar.

Amongst other attributes of the package (such as the project name, version, author/s, entry source code file and license), the package.json file lists other packages that need to be installed for the project to function correctly. In the JavaScript nomenclature, these other packages are known as "dependencies". The dependencies attribute of a package.json file lists the name of each dependency and its version that is specified according to the semantic versioning (or "Semver") standard.

In addition to the top-level package.json file for the project, each installed dependency has its own package.json file storing the metadata relevant to that package. The dependent package may have its own dependencies which are specified in the "dependencies" attribute of the package's package.json file.

Generally speaking, package managers automatically update the top-level package.json file when a new package is installed. In addition, package managers utilise the package.json file to install all of the listed dependencies that the project requires. This allows projects to be easily moved to another machine; namely by moving the package.json file and having the package manager on the new machine download the required packages.

As noted above, dependencies are listed in a package.json file using the Semver standard. This allows the developer to either specify a precise version of the dependency that is to be installed, or specify a range of versions. The package manager evaluates the specified dependency expression and installs the correct version. In this way, developers can auto-update their packages while avoiding unwanted break-in changes.

The current approach to dependency management is lacking in certain respects. For example, the current approach mandates that in multi-package projects (that are typically stored in a single repository or "monrepo"), the dependencies of all constituent packages must be updated to a new version at once. This can be inconvenient for developers, as updating a dependency version may impact different packages in different ways. In addition, depending on each package's source code, the task of identifying, testing and resolving break-in changes can vary dramatically from one package to the next.

Background information described in this specification is background information known to the inventors. Reference to this information as background information is not an acknowledgment or suggestion that this background information is prior art or is common general knowledge to a person of ordinary skill in the art.

SUMMARY

Described herein are software tools for managing package dependencies. The tools serve to augment the functions of package managers to allow developers to update package dependencies in a controlled manner. The tools are particularly suited to managing third-party dependencies; namely packages that are developed by parties unrelated to the project developer.

Embodiments of the present disclosure also allow new versions of dependencies to be released behind feature flags. Feature flags cannot be readily accommodated using current approaches to package structuring and dependency management.

Figure 1:
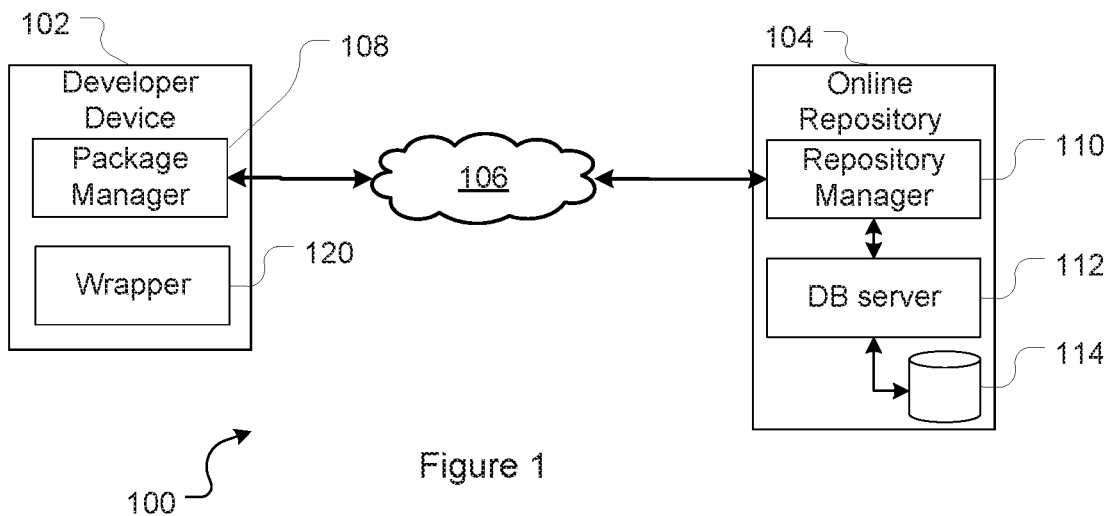
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

FIG. 1 depicts one example of a networked environment 100 in which the various operations and techniques described herein can be performed.

Networked environment 100 includes a developer device 102 and an online repository 104 which communicate via one or more communications networks 106 (e.g. the Internet).

Developer device 102 hosts a package manager 108 which, when executed by the developer device 102, configures the developer device 102 to provide package management functionality. As noted above, package manager 108 provides a CLI, through which the developer issues commands for the package manager to execute. In the illustrated embodiment, package manager 108 is the yarn package manager, however those skilled in the art will appreciate that the tools and techniques of the present disclosure can be practised on other package managers (for example npm).

Online repository 104 hosts a repository manager application 110. The repository manager application 110 is executed by the online repository 104 to configure it to provide server-side functionality to one or more corresponding client applications (e.g. package manager 108 as discussed above). The repository manager application 110 comprises one or more application programs, libraries, APIs or other software elements that together host software repositories and provide access thereto to client applications (such as package managers and version control clients).

An example of a repository manager application 110 is the npm Registry referenced above.

In the present example, online repository 104 also includes a database server 112. Database server 112 provides access to one or more databases 114 which store the software repositories to be accessed by the package managers 108.

The developer device 102 and server system 104 communicate data between each other either directly or indirectly through one or more communications networks 106. Communications network 106 may comprise a local area network (LAN), a public network, or a combination of networks.

While the online repository 104 of environment 100 is depicted and described as a single server machine, alternative architectures are possible. For example, in certain cases, a clustered server architecture may be used where multiple server computing instances (or nodes) are instantiated on one or more computer processing systems to meet system demand.

Developer device 102 may be any computer processing system which is configured (or configurable) by hardware and/or software to offer client-side functionality. Similarly, online repository 104 may be any computer processing system which is configured (or configurable) by hardware and/or software to provide server-side functionality. By way of example, suitable client and/or server systems may include: server computer systems, desktop computers, laptop computers, netbook computers, tablet computing devices, mobile/smart phones, personal digital assistants, personal media players, set-top boxes, games consoles.

Figure 2:
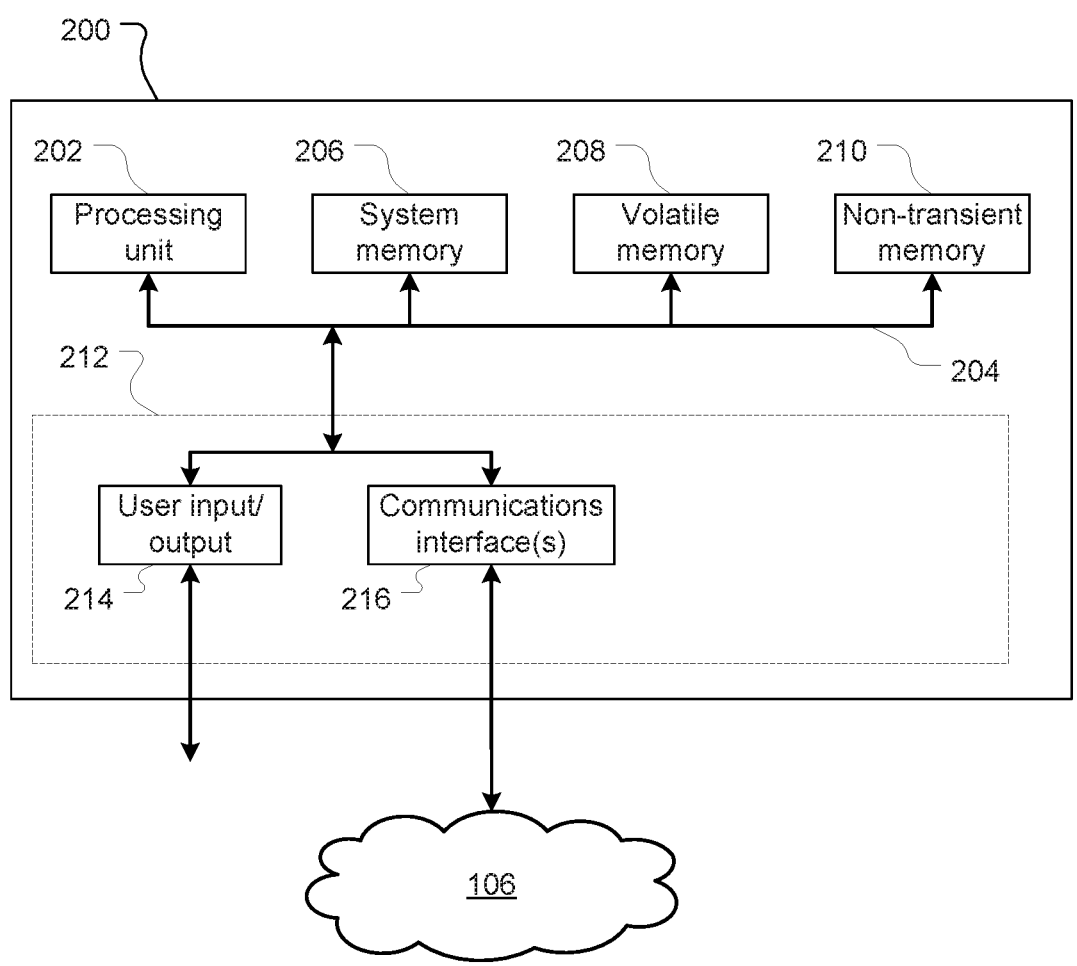
FIG. 2 is a block diagram of a computer processing system configurable to perform various features of the present disclosure.

One example of a computer processing system that may act as a developer device is described below with reference to FIG. 2. System 200 depicts an example computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202 (also referred to herein as a "processor"). The processing unit 202 may be a single computer processing device (e.g. a central processing unit, graphics processing unit, or other computational device), or may include a plurality of computer processing devices or processors even though it may be referred to as a singular processing unit 202 or processor. In some instances, where a computer processing system 200 is described as performing an operation or function, all processing required to perform that operation or function will be performed by processing unit 202. In other instances, processing required to perform that operation or function may also be performed by remote processing devices accessible to and usable by (either in a shared or dedicated manner) system 200.

Through a communications bus 204 the processing unit 202 is in data communication with a one or more computer- or machine-readable storage (memory) devices which store instructions, executable computer code, and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives). The non-volatile memory 210 may also be referred to herein as "computer-readable memory," and may be used to store a sequence of instructions, that when executed by the processing unit 202 (one or more processors) cause the processing unit 202 to perform one or more of the functions described herein.

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices 214 by which information/data is input into (received by) system 200. Such input devices may include keyboards, mice, trackpads, microphones, accelerometers, proximity sensors, GPS devices and the like. System 200 may also include or connect to one or more output devices 214 controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices 214, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 106 of environment 100. Via the communications interface(s) 216, system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient computer-readable memory accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows®, Apple OSX, Apple IOS, Android, Unix, or Linux.

System 200 also stores or has access to applications which, when executed by the processing unit 202, configure system 200 to perform various computer-implemented processing operations described herein. For example, and referring to the networked environment of FIG. 1 above, developer device 102 includes a package manager 108.

Developer device 102 also includes an integrated development environment for authoring the source code comprised in the project, and possibly a runtime environment (such as Nodejs) or framework (such as React) for executing the code.

Dependency Management

The present disclosure interfaces with package manager 108 through code hereinafter referred to as a "package manager wrapper" 120. Interfacing is achieved by modifying the package manager's configuration file that is created on the developer device 102 when the package manager is installed thereon. In the case of yarn, the configuration file is named ".yarnrc".

Amongst other package manager attributes, the .yarnrc file lists a directory path to the yarn executable. According to the present disclosure, the .yarnrc file is modified to list the directory path of the package manager wrapper 120 in the place of the path of the yarn executable. The path of the yarn executable is listed in a separate field in the modified .yarnrc file. In this way, when the developer invokes yarn, the code for the package manager wrapper 120 is executed by the operating system.

Initialisation

The package manager wrapper 120 runs in conjunction with the package manager 108 to implement the enhanced dependency-management functionality described below. In this regard, the present disclosure includes a routine (written in Javascript and executable in the Nodejs runtime environment) that modifies a package's top-level and child package.json files in a way that enables more efficient and flexible dependency management. The developer invokes the routine by entering a command (in the illustrated embodiment named "dependency-update:initialise") into a CLI that the package manager wrapper 120 provides. The "dependency-update:initialise" command takes one or more dependencies in Semver format (for example <pacakge@version>) as arguments.

The processing steps performed when the dependency-update:initialise command is invoked will be described with reference to the flowcharts of FIGS. 3 and 4.

Figure 3:
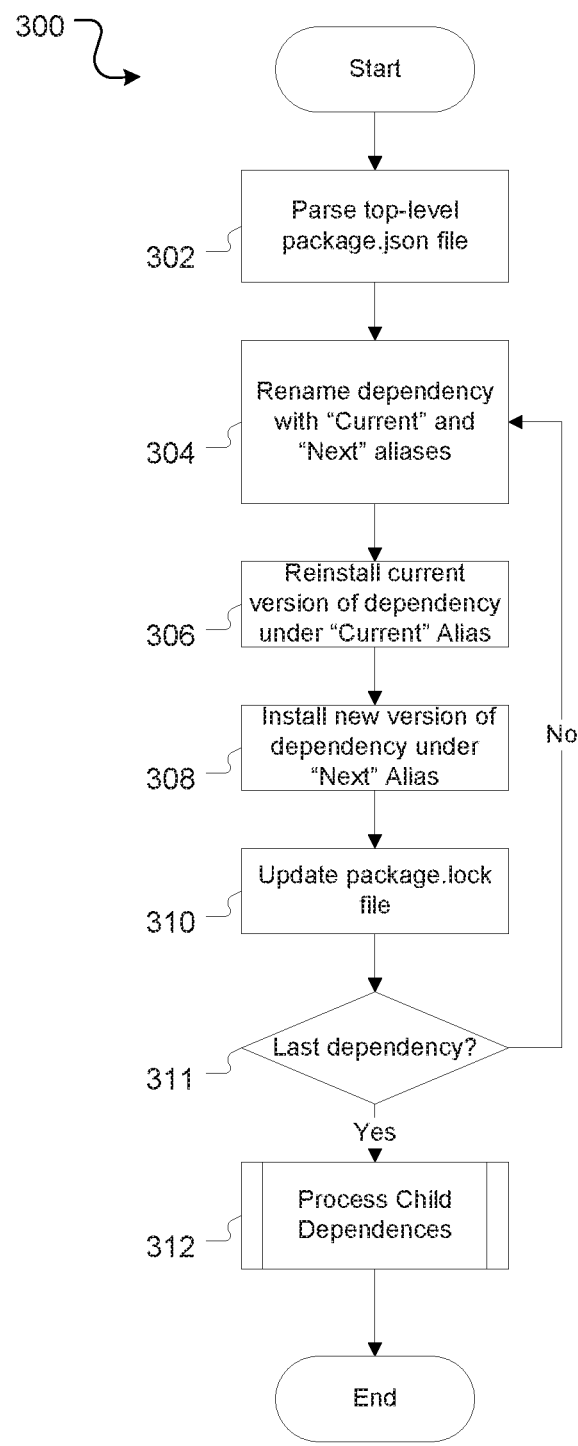
FIG. 3 is a flow chart illustrating computer operations performed to modify package configuration files and provide efficient and flexible dependency management.

Turning to FIG. 3, the processing steps 300 commence at step 302, at which the invoked command parses the package's top-level package.json file.

As noted above, dependencies are listed in a package.json file by name and semantic version. At step 304, the invoked command re-names the dependency passed to the command as an argument, with two different aliases. In the illustrated embodiment, these aliases are: "current" and "next", however different numbers of aliases and alias names may also be used. For code readability, it is preferable to use descriptive names for the aliases. Aliases allow multiple versions of a same-name package to be used at the same time.

By way of example, a dependency listed in a top-level package.json file as:
"button": "^1.0.0"
is renamed by the dependency-update:initialise command, with "button@^2.0.0" passed as an argument, as:
"button--current": "npm: @button@^1.0.0"
"button--next": "npm:@button@^2.0.0"

The semantic version number of the "next" dependency (in this case "button@^2.0.0") is passed as an argument to the dependency-update:initialise command at the time it is invoked by the developer.

At step 306, the package manager wrapper 120 executes a command in the package manager 108 to re-install the current version of the dependency under the "--current" alias.

At step 308, the package manager wrapper 120 executes a command in the package manager 108 to install the new version of the dependency (namely that passed as an argument to the dependency-update:initialise command) under the "--next" alias.

At step 310, the package manager wrapper 120 modifies the package's yarn.lock file by adding a "name" entry to the relevant dependency. In this regard, those skilled in the art will appreciate that a yarn.lock file serves to lock down the versions of the dependencies specified in a package.json file. A yarn.lock file typically includes an identifier for every dependency and sub-dependency that is used in the package.

For example, the package manager wrapper 120 adds the underlined line to the listing of "button@^2.0.0" in the yarn.lock file:
button@^2.0.0
name "button"
version "2.0.0".

At step 311, the package manager wrapper 120 determines whether the dependency being processed is the last dependency in the list of dependencies passed as arguments to the command. If there are additional dependencies to process, processing returns to step 304, at which the package manager modifies the top-level package.json file with the subsequent dependency in the argument list.

If the dependency is the last dependency in the list of dependencies, processing proceeds to step 312. At step 312, the package manager wrapper 120 processes the package.json file of each package listed in the src/packages directory (hereinafter referred to as "Child packages"). The processing steps performed on each Child package.json file are described with reference to the flowchart of FIG. 4. The processing steps 300 terminate after all Child package.json files have been processed.

Figure 4:
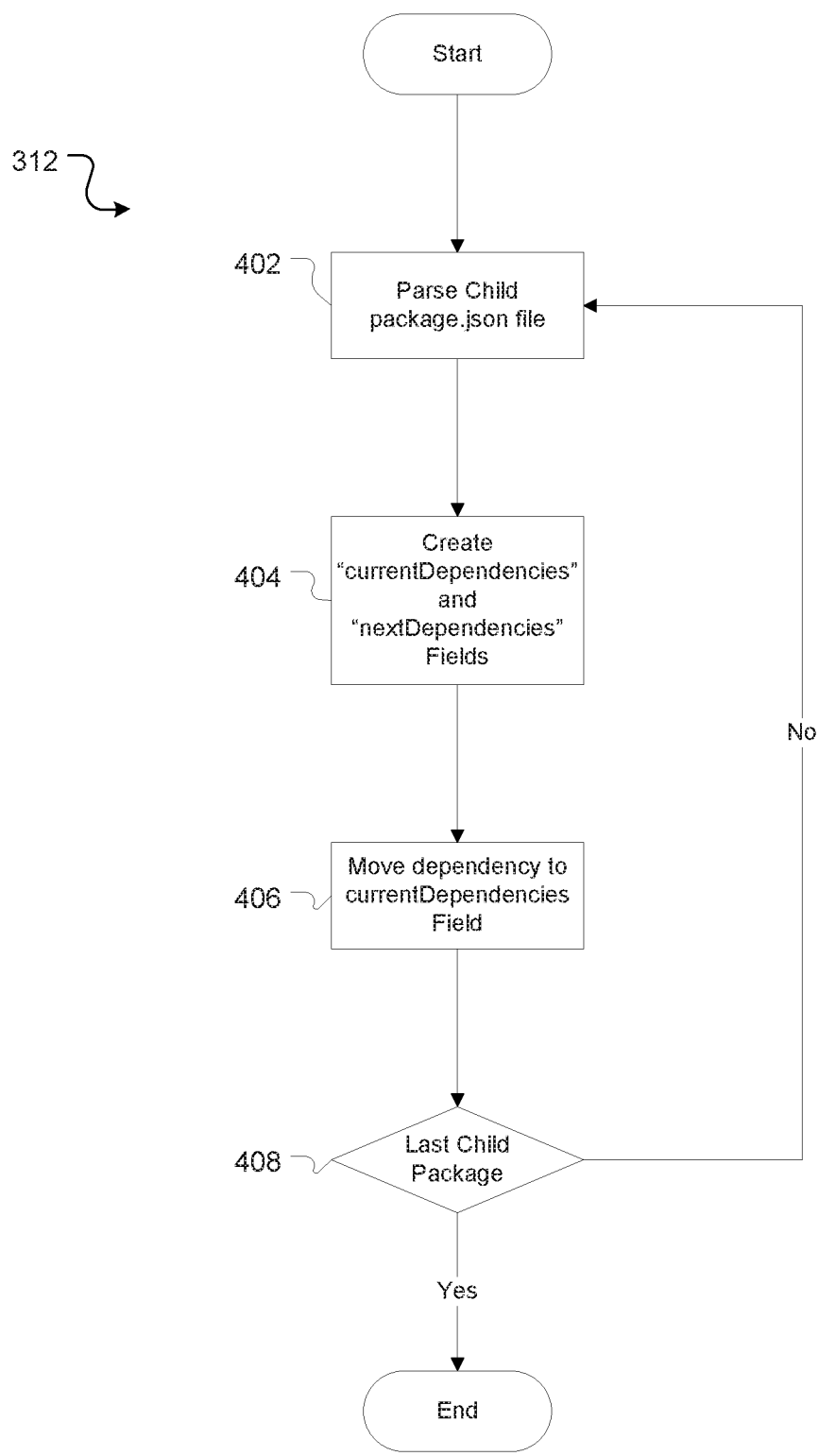
FIG. 4 is a flow chart illustrating computer operations performed to modify Child package configuration files.

Turning to FIG. 4, the processing steps 312 commence at step 402, at which the invoked command parses the first Child package.json file in the directory.

At step 404, the invoked command modifies the package.json file by including two custom fields: "currentDependencies" and "nextDependencies"; assuming that those fields do not already exist from earlier invocations of the dependency-update:initialise command Each of the custom fields is a JSON object that stores the relevant dependencies.

The "currentDependencies" field serves to indicate whether the package is using the current version of the dependency listed as an argument to the dependency-update: initialise command. In this scenario, the package manager wrapper 120 (at step 406) modifies the package.json file by moving the dependency from the "Dependencies" field to the newly-created "currentDependencies" field.

The package manager wrapper 120 may optionally verify that the version of the dependency listed in the Child package.json file matches the version of the "Current" dependency specified in the top-level package.json file.

At step 406, the package manager wrapper 120 performs a determination of whether the Child package is the last package in the directory. The process terminates in the event that the Child package is the last package in the directory. If there are more packages in the directory, the process returns to step 402 to commence processing of the next Child package.

By way of example, the processing steps 402-408 modify a Child package.json file in the following form:

```
{
    dependencies: {
        ...
        "button": "^1.0.0",
        ...
    }
}
, as follows:
{
    dependencies: {
        ...
    },
    "currentDependencies": {
        ...
        "button": "^1.0.0",
        ...
    }
}
Dependency Updating
```

The package manager wrapper 120 and CLI commands provide a facility to developers to selectively update the dependencies in a package/repository. The facility is particularly useful in a monorepo that is comprised of multiple packages with common dependencies. In the monorepo scenario, the facility allows one development team to independently update their package to the next version of the dependency, while another team can continue using the current version of the dependency in their package (for example until break-in changes associated with the next version of the dependency are identified and resolved).

At the same time, users of the monorepo have the benefit of enhanced functionality from packages with updated dependencies and stability from packages with current dependencies.

The facility is provided by way of a CLI command; in the illustrated embodiment named "dependency-update:main". As with the dependency-update:initialise command, in the illustrated embodiment, the dependency-update:main command is written in Javascript and executable in the Node.js runtime environment).

The "dependency-update:main" command is invoked for the packages in the monorepo that teams are collectively developing. The command is invoked by different teams asynchronously, until all packages comprised in the monorepo are updated.

The dependency-update:main command takes a "dependency" (or a space-separated list of two or more dependencies) as an argument, without a version number. Usually, the dependencies are third-party dependencies that are to be updated.

Figure 5:
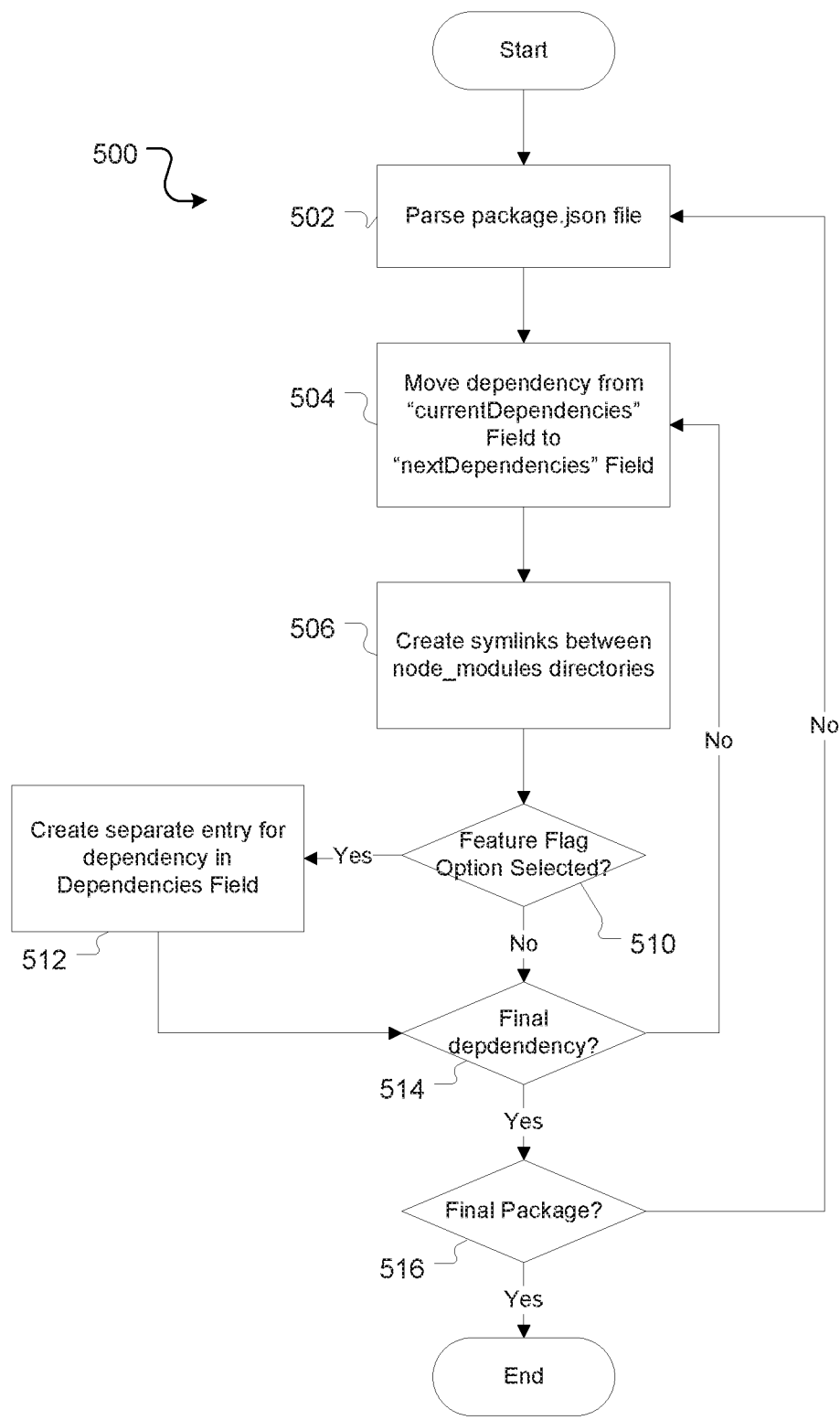
FIG. 5 is a flow chart illustrating computer operations performed to update the versions of package dependencies.

The dependency-update:main command has the following flags (described further below):
--teams="<team-names>"
--packages="<package-names>"
--should-be-feature-flaggable The processing steps 500 performed by the "dependency-update:main" command to provide the selective-upgrade functionality will be described with reference to the flowchart of FIG. 5.

At step 502, the invoked command parses the package.json file of the package passed to the command in the "--packages" flag.

At step 504, the invoked command modifies the package.json file by moving the dependency specified in the "dependency" argument from the currentDependencies field to the nextDependencies field. The version number of the dependency moved to the nextDependencies field is set to that of the "Next" dependency in the top-level package.json file.

At step 506, the package manager wrapper 120 creates a symbolic link from the package's node_modules directory to the node_modules directory of the top-level package.json file.

At step 510, the invoked command determines whether the "--should-be-feature-flaggable" flag was included with the dependency-update:main command. As noted above, in contrast to the systems of the prior art, the present disclosure allows dependency updates to be released behind a feature flag. This functionality is triggered by the developer including the "should-be-feature-flaggable" flag with the dependency-update:main command.

If the "--should-be-feature-flaggable" flag is included in the command, processing proceeds to step 512, at which the invoked command modifies the package.json file by creating a separate entry for the current dependency in the standard Dependencies field.

At step 514, the invoked command determines whether the dependency being processed is the last dependency in the list of dependencies passed as arguments to the command. If there are additional dependencies to process, processing returns to step 504, at which the invoked command modifies the package.json file with the subsequent dependency in the argument list.

Processing proceeds to step 516 if the dependency is the last dependency in the list of dependencies. At step 516, the invoked command determines whether the package being processed is the last package listed in the "--packages" flag. If there are additional packages to process, processing returns to step 502, at which the invoked command parses the package.json file of the subsequent package listed in the "--packages" flag.

Processing terminates after the final package listed in the "--packages" flag has been processed.

As noted above, the "--packages" flags allow updates to be performed on one or more Child packages. When the "--teams" flag is included, the command identifies all packages in the monorepo owned by the listed "team-names" and performs the dependency update on all identified packages.

By way of example, executing the command "dependency-update:main button" without the "should-be-feature-flaggable" flag, transforms the following package.json file (namely for a package in the monorepo that a team is developing):

```
{
  dependencies: {
  ...
  },
  "currentDependencies": {
  ...
```

```
  "button": "^1.0.0",
  ...
  }
}
to the following form:
{
  dependencies: {
  ...
  },
  "currentDependencies": {
  ...
  },
  "nextDependencies": {
  ...
  "button": "^2.0.0",
  ...
  }
}
```

When the "should-be-feature-flaggable" flag is included, the package.json file is transformed to the following form:

```
{
  dependencies: {
  ...
  "button--current": "npm:button@^1.0.0",
  },
  "currentDependencies": {
  ...
  },
  "nextDependencies": {
  ...
  "button": "^2.0.0",
  ...
  }
}
Finishing Updates
```

The present disclosure includes a CLI command; in the illustrated embodiment named "dependency-update:finish" that a developer can invoke after the dependencies of all of the child packages in the monorepo have been updated. In the illustrated embodiment, the dependency-update:finish command is written in Javascript and is executable in the Node.js runtime environment.

The dependency-update:finish command takes a "dependency" (or a space-separated list of two or more dependencies) as an argument, without a version number.

Figure 6:
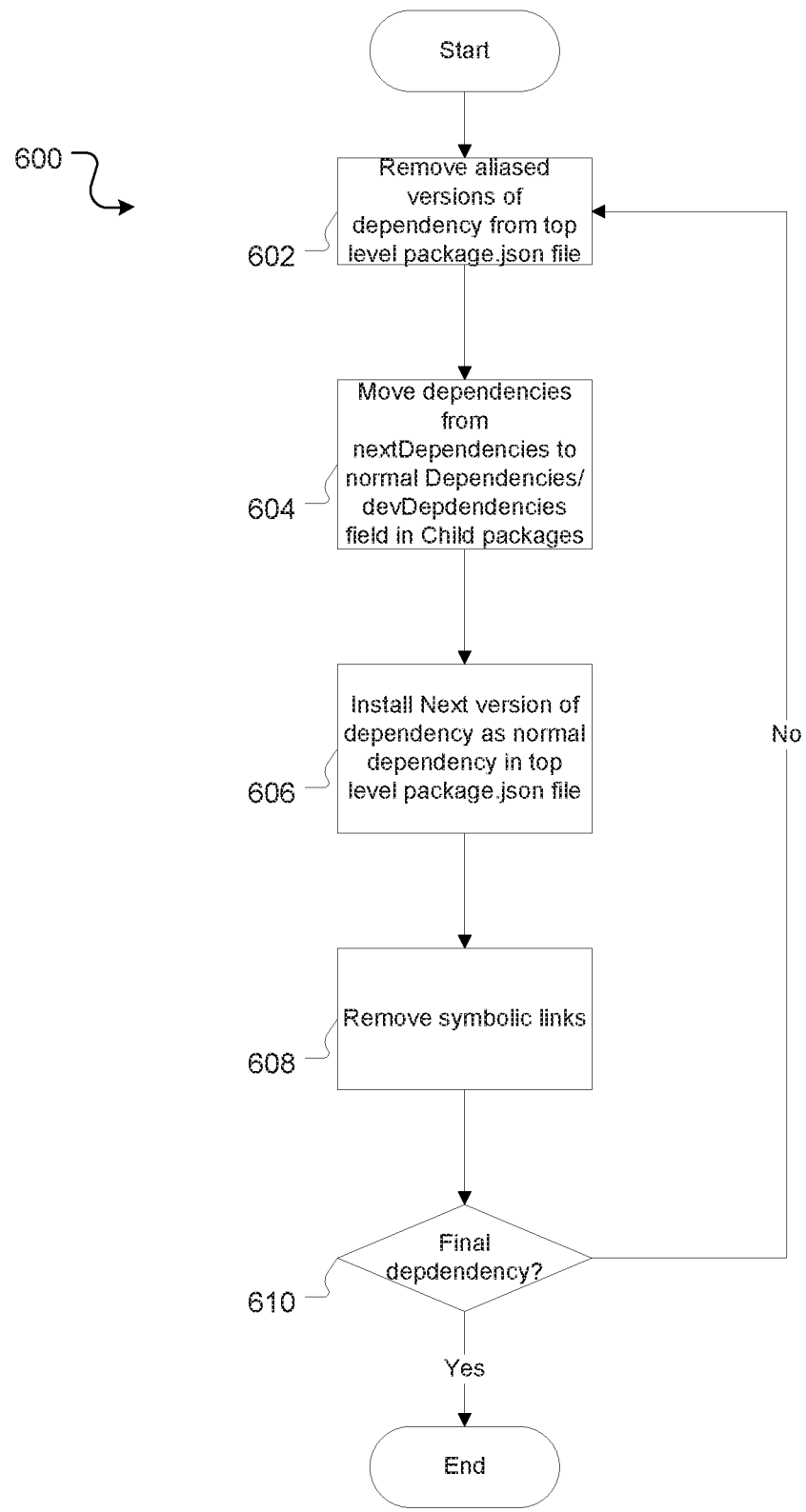
FIG. 6 is a flow chart illustrating computer operations performed subsequent to the operations illustrated in FIG. 5.

The processing steps 600 performed by the dependency-update:finish command will be described with reference to the flowchart of FIG. 6. Processing is contingent on the dependency-update:main command having been performed on all Child packages comprised in the monorepo.

At step 602, the package manager wrapper 120 modifies the top-level package.json file by removing the aliased versions of the dependency from the Dependencies field.

At step 604, the package manager wrapper 120 modifies the package.json file of each Child package by moving the dependency from the custom nextDependencies field to the normal "Dependencies" or "devDependencies" field.

At step 606, the package manager wrapper 120 invokes the package manager 108 to install the Next version of the dependency as a normal dependency in the top-level package.json file.

At step 608, the package manager wrapper 120 removes any symbolic links between the node-modules directories of the Child and top-level packages that relate to the introduced "Current" and "Next" dependencies.

At step 610, the package manager wrapper 120 determines whether the dependency being processed is the last dependency in the list of dependencies passed as arguments to the "dependency-update:finish" command. If there are additional dependencies to process, processing returns to step 602, at which the package manager wrapper modifies the top level package.json with the next dependency in the argument list.

Processing terminates after the last dependency has been processed.

By way of example, executing the command "dependency-update:finish button" transforms the following top level package.json file:

```
{
    dependencies: {
        ...
        "button--current": "npm:@button@^1.0.0",
        "button--next": "npm:@button@^2.0.0",
        ...
    }
}
to the following form:
{
    dependencies: {
        ...
        "button": "^2.0.0",
        ...
    }
}
```

By way of example, executing the command "dependency-update:finish button" transforms the following Child package.json file:

```
{
    dependencies: {
        ...
    },
    "currentDependencies": {
        ...
    },
    "nextDependencies": {
        ...
        "button": "^2.0.0",
        ...
    },
}
``` to the following form:

```
{
    dependencies: {
        ...
        "button": "^2.0.0",
        ...
    }
}
```

In the case of a Child package.json file generated using the "should-be-feature-flaggable" flag, executing the command "dependency-update:finish button" transforms the following Child package.json file:

```
{
    dependencies: {
        ...
        "button--current": "npm:button@^1.0.0",
    },
    "currentDependencies": {
        ...
```

```
    },
    "nextDependencies": {
        ...
        "button": "^2.0.0",
        ...
    }
},
``` to the following form:

```
{
    dependencies: {
        ...
        "button": "^2.0.0",
        ...
    }
}
```

It will be realised the present disclosure provides software tools that: gradually update 3rd-party dependencies in a monorepo; and facilitate feature-flaggable dependency updates.

Software tools according to the present disclosure define two versions of the package (Current and Next) in the top-level package.json file, that may be used in the monorepo.

In the child package.json files, two custom fields: currentDependencies and nextDependencies are utilised. If the package is using the current version of the dependency, it will be defined in currentDependencies field and the definition is forced to match the definition of current version of the package in the top-level package.json file. Once owners of the package decide to upgrade the dependency to next version, the tool automatically moves the dependency definition from currentDependencies field to nextDependencies field and update it to match next version in the top-level package.json.

This approach allows child package owners to update their dependencies independent of other child packages. In the illustrated embodiment, the number of available versions of dependencies is limited to two. In other words, until all the child packages are updated to use the next version of the dependency, they are unable to update to a yet newer version of the dependency. This preserves a level of consistency among the dependencies in the monorepo, as opposed to a scenario when all the child packages are updating their dependencies completely independently.

In case of more complicated dependency updates, developers can switch between two versions of the dependency using a feature flag. This allows the delivery of both versions of the code (old and new), which can be toggled in run-time without the need to redeploy a new version.

Previously, there was no easy way to deliver a new version of a dependency to production behind a feature flag. As result, a dependency update was a risky all-or-noting nothing proposition.

For this case, the present disclosure supports a possibility for a package to have both versions of the same dependency. In this scenario, the next version of the dependency is stored in the nextDependencies field and the current version of the dependency is stored in dependencies field under the name of <dependency-name>--current. This setup allows developers to import the next version of dependency under its normal name and current version of dependency under the name of <dependency-name>--current in the same file.

The feature flag configuration also decreases the amount of churn in the source code, compared to the case when developers are forced to use <dependency-name>--current and <dependency-name>--next.

The present disclosure keeps package.json files in a consistent state, by updating the Dependencies, devDependencies, currentDependencies and nextDependencies field values to the correct state when the developer requires. The state is calculated based on the current contents of the files and the command passed to the package manager.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for managing a repository, the repository including one or more component packages and a repository configuration file, the method comprising:
    accessing the repository configuration file listing a set of repository dependencies specifying a software build, each repository dependency of the set of repository dependencies identifying a component package of source code stored in the repository;
    parsing the repository configuration file;
    based on a repository dependency of the set of repository dependencies listed in the repository configuration file, generating an updated repository dependency to include at least a first repository dependency alias and a second repository dependency alias, the first and second repository dependency aliases correspond to a same package dependency listed in a package configuration file of a component package of the one or more component packages, the second repository dependency alias representing a newer version of the package dependency than the first repository dependency alias;
    parsing the package configuration file;
    linking the first repository dependency alias to a first package dependency listed in the package configuration file and the second repository dependency alias to a second package dependency listed in the package configuration file; and
    de-aliasing the first repository dependency alias and the second repository dependency alias to restore the repository dependency, wherein the de-aliasing is performed after all component packages comprised in the repository are updated for dependency.

2. The computer-implemented method of claim 1, further comprising:
    receiving as an argument to the computer-implemented method, a dependency having a value; and
    assigning the value of the received dependency to the second repository dependency alias.

3. The computer-implemented method of claim 1, further comprising reinstalling in the repository, the repository dependency under the first repository dependency alias.

4. The computer-implemented method of claim 3, further comprising:
    receiving as an argument to the computer-implemented method, a dependency having a value; and
    installing in the repository, the received dependency under the second repository dependency alias.

5. The computer-implemented method of claim 1, wherein the step of linking comprises entering, in the package configuration file, a first package dependency field for the first repository dependency alias and a second package dependency field for the second repository dependency alias.

6. The computer-implemented method of claim 5, further comprising:
    receiving as an argument to the computer-implemented method, a dependency; and
    modifying the package configuration file to update the received dependency.

7. The computer-implemented method of claim 6, wherein the modifying comprises moving the received dependency from the first package dependency field to the second package dependency field.

8. The computer-implemented method of claim 7, further comprising assigning a value of the second repository dependency alias to the received dependency in the second package dependency field.

9. The computer-implemented method of claim 6, further comprising creating an entry for the received dependency in a dependency field of the package configuration file.

10. The computer-implemented method of claim 1, further comprising: modifying the package configuration file of each component package by moving package dependencies listed in a second package dependency field to a dependencies field or a development dependencies field of the package configuration file.

11. A computer processing system comprising:
    one or more processors;
    computer-readable memory storing sequences of instructions, which when executed by the one or more processors, cause the one or more processors to:
        manage a repository, the repository including one or more component packages and a repository configuration;

access the repository configuration file listing repository dependencies specifying a software build, each repository dependency of the repository dependencies identifying a component package of source code stored in the repository;

based on a repository dependency of the repository dependencies listed in the repository configuration file, generate an updated repository dependency to include at least a first repository dependency alias and a second repository dependency alias corresponding to a same package dependency listed in a package configuration file of a component package of the one or more component packages, the second repository dependency alias representing a newer version of the package dependency than the first repository dependency alias;

parse the package configuration file;

link the first repository dependency alias to a first package dependency listed in the package configuration file and the second repository dependency alias to a second package dependency listed in the package configuration file; and de-alias the first repository dependency alias and the second repository dependency alias to restore the repository dependency, wherein the de-aliasing is performed after the received dependency is updated in all component packages comprised in the repository.

12. The computer processing system of claim 11, wherein execution of the sequences of instructions further cause the one or more processors to:
receive as an argument to the sequences of instructions, a dependency having a value; and
assign the value of the received dependency to the second repository dependency alias.

13. The computer processing system of claim 11, wherein execution of the sequences of instructions further cause the one or more processors to reinstall in the repository, the repository dependency under the first repository dependency alias.

14. The computer processing system of claim 13, wherein execution of the sequences of instructions further cause the one or more processors to:
receive as an argument to the sequences of instructions, a dependency having a value; and
install in the repository, the received dependency under the second repository dependency alias.

15. The computer processing system of claim 11, wherein the linking comprises entering, in the package configuration file, a first package dependency field for the first repository dependency alias and a second package dependency field for the second repository dependency alias.

16. The computer processing system of claim 15, wherein execution of the sequences of instructions further cause the one or more processors to:
receive as an argument to the sequences of instructions, a dependency; and
modify the package configuration file to update the received dependency.

17. The computer processing system of claim 16, wherein the modifying comprises moving the received dependency from the first package dependency field to the second package dependency field.

18. The computer processing system of claim 17, wherein execution of the sequences of instructions further cause the one or more processors to assign a value of the second repository dependency alias to the received dependency in the second package dependency field.

19. The computer processing system of claim 16, wherein execution of the sequences of instructions further cause the one or more processors to create an entry for the received dependency in a dependency field of the package configuration file.

20. The computer processing system of claim 11, wherein execution of the sequences of instructions further cause the one or more processors to modify the package configuration file of each component package by moving package dependencies listed in the package dependency field to a dependencies field or a development dependencies field of the package configuration file.

* * * * *